US010358000B2

(12) United States Patent
Kubo et al.

(10) Patent No.: US 10,358,000 B2
(45) Date of Patent: Jul. 23, 2019

(54) TIRE FOR TWO-WHEELED MOTOR VEHICLE

(71) Applicant: BRIDGESTONE CORPORATION, Tokyo (JP)

(72) Inventors: Yukihiko Kubo, Tokyo (JP); Daita Itoi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 814 days.

(21) Appl. No.: 14/787,547

(22) PCT Filed: Apr. 1, 2014

(86) PCT No.: PCT/JP2014/059676
§ 371 (c)(1),
(2) Date: Oct. 28, 2015

(87) PCT Pub. No.: WO2014/181614
PCT Pub. Date: Nov. 13, 2014

(65) Prior Publication Data
US 2016/0075187 A1     Mar. 17, 2016

(30) Foreign Application Priority Data

May 9, 2013   (JP) ................................ 2013-099489

(51) Int. Cl.
*B60C 11/03*      (2006.01)
*B60C 11/13*      (2006.01)

(52) U.S. Cl.
CPC ...... *B60C 11/0327* (2013.01); *B60C 11/0302* (2013.01); *B60C 11/032* (2013.01);
(Continued)

(58) Field of Classification Search
CPC ............. B60C 2200/10; B60C 11/0302; B60C 11/032; B60C 11/13; B60C 11/0327;
(Continued)

(56) References Cited

U.S. PATENT DOCUMENTS

| 4,617,976 A | * | 10/1986 | Kawajiri | ............... B60C 11/032 |
| | | | | 152/209.11 |
| D617,260 S | | 6/2010 | Larregain | |

(Continued)

FOREIGN PATENT DOCUMENTS

| EP | 2 554 403 A1 | 2/2013 |
| JP | S62-118704 U | 7/1987 |

(Continued)

OTHER PUBLICATIONS

Mar. 16, 2016 extended Search Report issued in European Patent Application No. 14795525.6.
(Continued)

*Primary Examiner* — Steven D Maki
*Assistant Examiner* — Philip N Schwartz
(74) *Attorney, Agent, or Firm* — Oliff PLC (57) ABSTRACT

A tire center slant groove near tread surface tire equatorial plane extends toward reverse rotation-direction of designated rotation-direction while slanting from a tire equatorial plane side to a tire-width direction outer side, an extension direction angle forms with respect to a tire circumference-direction within range, 3°-10°; and at center slant groove-end portion in reverse rotation-direction, at least a tire-width direction outer side groove-edge of the center slant groove forms into a circular-arc-shaped portion to have the tire-width direction outer side groove-edge angle formed with respect to tire circumference-direction, the angle increasing toward reverse rotation-direction, the tire-width direction outer side groove-edge angle of the center slant groove forms with respect to tire circumference-direction larger than an angle of a tire-width direction inner side groove-edge of the center slant groove forms with respect to tire circumference-direction, and the center slant groove depth gradually decreases toward the center slant groove-edge in reverse rotation-direction.

15 Claims, 2 Drawing Sheets (52) U.S. Cl.
CPC .......... *B60C 11/13* (2013.01); *B60C 11/1315* (2013.01); *B60C 11/1353* (2013.01); *B60C 2011/0374* (2013.01); *B60C 2011/0379* (2013.01); *B60C 2011/0381* (2013.01); *B60C 2200/10* (2013.01)

(58) Field of Classification Search
CPC ............. B60C 11/1315; B60C 11/1353; B60C 2011/0374; B60C 2011/0381; B60C 2011/0379
USPC ............ 152/209.11; D12/534, 535, 569, 570
See application file for complete search history.

(56) References Cited

U.S. PATENT DOCUMENTS

| | | |
|---|---|---|
| D629,740 S | 12/2010 | Board |
| 2013/0014869 A1* | 1/2013 | Makioka ............. B60C 11/0302 152/209.11 |
| 2013/0186535 A1 | 7/2013 | Oshima |
| 2013/0199683 A1 | 8/2013 | Takenaka |

FOREIGN PATENT DOCUMENTS

| | | | | |
|---|---|---|---|---|
| JP | 05201207 A | * | 8/1993 | ......... B60C 11/0302 |
| JP | 1339331 S | | 9/2008 | |
| JP | 1393392 S | | 7/2010 | |
| JP | 2011-189805 A | | 9/2011 | |
| JP | 1435352 S | | 3/2012 | |
| JP | 2012-206669 A | | 10/2012 | |
| JP | 2012-236478 A | | 12/2012 | |
| JP | 2013-159208 A | | 8/2013 | |
| WO | 2011/012977 A1 | | 2/2011 | |
| WO | 2011/041859 A1 | | 4/2011 | |
| WO | 2012/001907 A1 | | 1/2012 | |

OTHER PUBLICATIONS

Apr. 28, 2014 International Search Report issued in International Patent Application No. PCT/JP2014/059676.

* cited by examiner

TIRE FOR TWO-WHEELED MOTOR VEHICLE

TECHNICAL FIELD

The present invention relates to a tire for a two-wheeled motor vehicle (hereinafter also simply referred to as "tire"), and particularly to an improvement of a tread pattern of a pneumatic radial tire for a two-wheeled motor vehicle that is useful for a high-speed performance two-wheeled motor vehicle suitable for circuit running.

BACKGROUND ART

Conventionally, in tires for a two-wheeled motor vehicle exclusively for circuit running, to ensure a gripping force during high-speed cornering, tires having relatively small proportion of grooves occupying in a tread surface (negative ratio) have been in the mainstream. Moreover, since an input force to the tires during circuit running is significantly large as compared with that during general public road running, in such tires for a two-wheeled motor vehicle, merely changing an arrangement of the grooves may cause significant deterioration of skin friction, and a maximum running speed is also high, so that a high-speed running performance is also required.

Further, due to a characteristic of a two-wheeled vehicle that corners by banking a body in a manner different from a four-wheeled vehicle, such as a passenger car and a truck, a tire for a two-wheeled motor vehicle has a tire shape in which a tire crown portion has a small curvature as compared with that of a tire for a four-wheeled vehicle and a cross section is round. Thus, according to ground contact states, when particularly a large drive force is applied, slippage portions in a ground contact surface are uneven depending on positions of a ground contact portion, and uneven wear in which specific portions are drastically worn out is likely to occur, which has been a problem.

In the prior art related to tires for a two-wheeled motor vehicle, for example, Patent Document 1 discloses a technique of arranging, on a tread surface, a bent main groove including a first groove extending toward a designated tire rotation direction while slanting toward a tread width direction outer side and a second groove extending in a reverse rotation direction from a reverse rotation direction end portion thereof while slanting toward the tread width direction outer side.

RELATED ART DOCUMENT

Patent Document

Patent Document 1: Japanese Unexamined Patent Application Publication No. 2011-189805 (claims, etc.)

SUMMARY OF THE INVENTION

Problems to be Solved by the Invention

Recently, in accordance with improvements of a vehicle body performance due to an enlarged size, an enhanced horsepower, or the like, and increasing interests in races, an input force to the tires has become larger and larger, and thus, with a conventional treat pattern, a stress concentrates on bent portions of the grooves so that uneven wear may occur around the bent portions. Moreover, in the vicinity of groove portions arranged at a large angle with respect to a tire circumference direction, rigidity in the tire circumference direction decreases. Consequently, it has been feared that, in the tires for a two-wheeled motor vehicle in which slippage against a tread surface is inherently likely to occur due to an outer contour having a small curvature, uneven wear progresses particularly during straight running. Further, in the tires having small negative ratio, a drainage property is likely to be insufficient, which has been also a problem.

According to the tire disclosed in Patent Document 1, suppressing a decrease in ground contact area against an input force from a road surface while improving a drainage property allows both a grip performance and a wet performance to be maintained at a high level, whereas, further, a tire for a two-wheeled motor vehicle that is further improved also in uneven-wear resistance property and high-speed running performance has been sought to be realized.

It is thus an object of the present invention to solve the above problems and provide a tire for a two-wheeled motor vehicle that is intended to suppress occurrence of uneven wear while improving a drainage property and a steering stability performance during high-speed running.

Means for Solving the Problems

As a result of intensive studies, the present inventors have found out that optimizing an angle and an arrangement of grooves arranged on a tread surface allows the above problems to be solved so as to achieve the present invention.

In other words, a tire for a two-wheeled motor vehicle of the present invention is a tire for a two-wheeled motor vehicle in which a rotation direction when mounted on a vehicle is designated, the tire comprising:

a center slant groove in the vicinity of a tire equatorial plane of a tread surface that extends toward a reverse rotation direction of the designated rotation direction while slanting from a tire equatorial plane side to a tire width direction outer side, wherein an angle of an extension direction of the center slant groove that is formed with respect to a tire circumference direction is within a range of 3° to 10°, and at an end portion of the center slant groove in the reverse rotation direction, at least a tire width direction outer side groove edge of the center slant groove is formed into such a circular-arc-shaped portion as to have an angle of the tire width direction outer side groove edge that is formed with respect to the tire circumference direction, the angle increasing toward the reverse rotation direction, the angle of the tire width direction outer side groove edge of the center slant groove that is formed with respect to the tire circumference direction is larger than an angle of a tire width direction inner side groove edge of the center slant groove that is formed with respect to the tire circumference direction, and a groove depth of the center slant groove gradually decreases toward a groove edge of the center slant groove in the reverse rotation direction.

In the tire of the present invention, it is preferable to comprising: at a tire width direction outer side than an end portion of the center slant groove at a tire width direction inner side, and at a location failing to be overlapped with the center slant groove in the tire circumference direction, an outer side slant groove that extends toward the reverse rotation direction while slanting from the tire equatorial plane side to the tire width direction outer side, wherein an angle of an extension direction of the outer side slant groove that is formed with respect to the tire circumference direction is larger than an angle of an extension direction of the center slant groove that is formed with respect to the tire circumference direction. Further, in the tire of the present invention, it is preferable that an end portion of the outer side slant groove at the tire width direction inner side overlaps with the center slant groove in a tire width direction, a groove depth of the outer side slant groove gradually decreases, at an end portion in the rotation direction, toward a groove edge of the outer side slant groove in the rotation direction, and, at an end portion of the outer side slant groove in the rotation direction, an angle of a tire width direction inner side groove edge that is formed with respect to the tire circumference direction is larger than an angle of a tire width direction outer side groove edge that is formed with respect to the tire circumference direction.

Further, in the tire of the present invention, it is preferable that the end portions of the center slant groove and the outer side slant groove that are adjacent to each other include corresponding groove edges parallel to each other. Still further, in the tire of the present invention, it is preferable that at an end portion of the center slant groove in the rotation direction, the groove depth of the center slant groove gradually decreases toward a groove edge of the center slant groove in the rotation direction, and an angle of a tire width direction inner side groove edge of the center slant groove that is formed with respect to the tire circumference direction is larger than an angle of a tire width direction outer side groove edge of the center slant groove that is formed with respect to the tire circumference direction.

Effects of the Invention

According to the present invention, employing the above configuration has enabled a tire for a two-wheeled motor vehicle that is intended to suppress occurrence of uneven wear while improving a drainage property and a steering stability performance during high-speed running to be realized.

MODE FOR CARRYING OUT THE INVENTION

Hereinafter, embodiments of the present invention will be described in detail with reference to the drawings.

Figure 1:
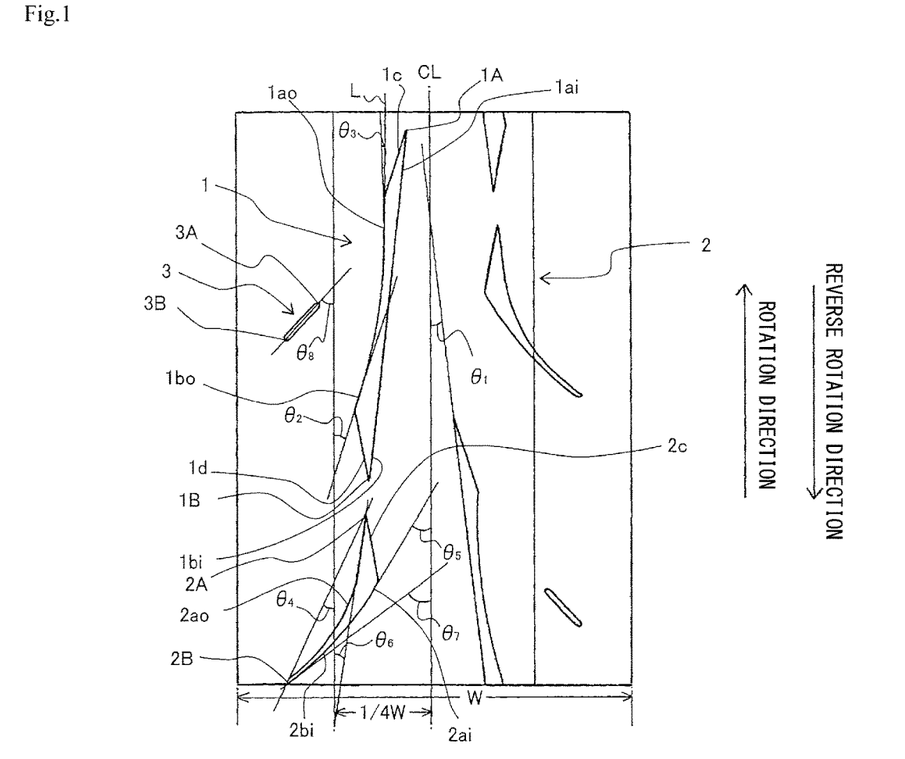
FIG. 1 is a partial developed view illustrating a tread of one example of a tire for a two-wheeled motor vehicle of the present invention.

In FIG. 1, a partial developed view illustrating a tread of one example of a tire for a two-wheeled motor vehicle of the present invention is shown. The tire for a two-wheeled motor vehicle of the present invention has a so-called directional pattern in which, as illustrated, a rotation direction when mounted on a vehicle is designated. Note that an arrow in FIG. 1 represents the rotation direction (designated rotation direction) when the tire as illustrated is mounted on a vehicle.

The tire of the present invention includes a center slant groove 1 in the vicinity of a tire equatorial plane CL of a tread surface that extends toward a reverse rotation direction of the designated rotation direction, that is, a direction opposite to the arrow in the drawing while slanting from a tire equatorial plane CL side to a tire width direction outer side. Since this center slant groove 1 is a slant groove failing to include a bent portion as illustrated, no portion on which a stress concentrates is present, and no uneven wear occurs.

An angle θ1 of an extension direction of this center slant groove 1 that is formed with respect to a tire circumference direction is within a range of 3° to 10°. Here, in the present invention, the extension direction of the center slant groove 1 is defined, as illustrated, as a direction of a straight line in which outermost points 1A, 1B of the center slant groove 1 in the tire circumference direction are connected to each other. In this manner, in the present invention, the center slant groove 1 is arranged at such an angle nearly in the tire circumference direction that the angle θ1 formed with respect to the tire circumference direction is 10° or less, so that rigidity in the tire circumference direction can be kept high and occurrence of uneven wear during straight running can be suppressed as well. Moreover, since the extension direction of the center slant groove 1 is a direction along a tire input force, such a deformation as to decrease a ground contact area can be suppressed also against an input force during high-speed running or the like. If the angle θ1 of the extension direction of the center slant groove 1 is less than 3°, draining water to the tire width direction outer side is prevented so that a drainage property cannot be ensured, and if the angle θ1 of the extension direction of the center slant groove 1 is more than 10°, an effect of suppressing the above uneven wear, and the like cannot be sufficiently obtained. Since configuring the angle θ1 to be 3° or more allows the drainage property to be obtained, to maintain both the drainage property and an uneven-wear property, the angle θ1 is required to be within the range of 3° to 10°.

The center slant groove 1 according to the present invention can be considered to have a small angle with respect to the tire circumference direction in view of drainage property, while, in the present invention, at an end portion of the center slant groove 1 in the reverse rotation direction, at least a tire width direction outer side groove edge 1bo of the center slant groove 1 is formed into such a circular-arc-shaped portion as to have an angle thereof formed with respect to the tire circumference direction that increases toward the reverse rotation direction. Thus, this circular-arc-shaped portion allows an effect of draining water along the center slant groove 1 toward the tire width direction outer side to be obtained so that the drainage property never decreases. Here, the circular-arc-shaped portion means to include a circular-arc shape or a shape formed into a circular-arc shape by connecting straight lines.

Figure 2:
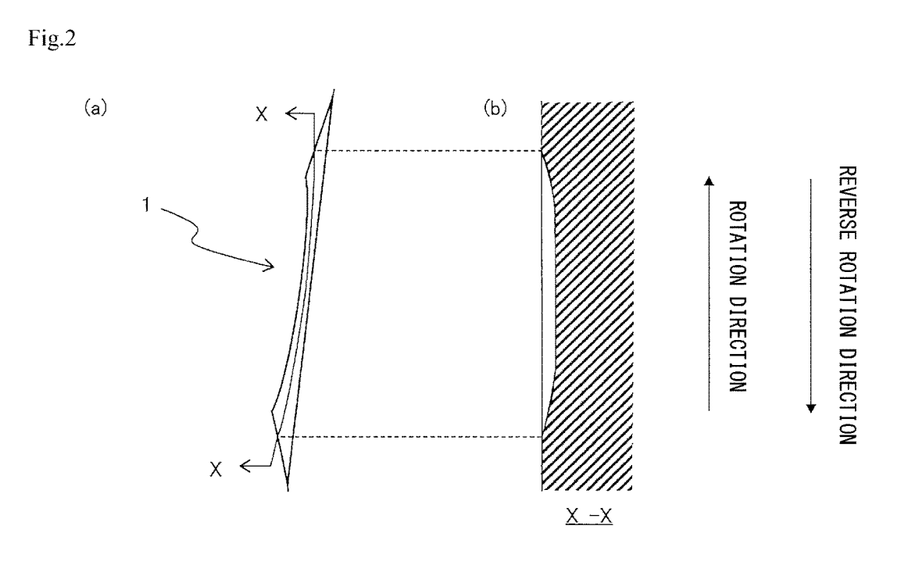
FIG. 2(a) is a plan view illustrating a center slant groove as taken out.
FIG. 2(b) is a cross-sectional view taken along line X-X in FIG. 2(a).

On the other hand, as described above, in the center slant groove 1, increasing an angle of the tire width direction outer side groove edge 1bo that is formed with respect to the tire circumference direction results in a direction in which the rigidity in the tire circumference direction decreases, so that the possibility of occurrence of uneven wear increases. Thus, in the present invention, at the end portion of the center slant groove 1 in the reverse rotation direction, a groove depth of the center slant groove 1 is made to gradually decrease toward a groove edge 1d of the center slant groove 1 in the reverse rotation direction. In FIG. 2(a), a plan view illustrating the center slant groove 1 as taken out is shown, and in FIG. 2(b), a cross-sectional view of the center slant groove along a width direction center line that is taken along line X-X in FIG. 2(a) is shown. As illustrated, in the present invention, the groove depth of the center slant groove 1 is made to gradually decrease at the end portion thereof in the reverse rotation direction so that a decrease in rigidity in the tire circumference direction at this portion is suppressed and uneven wear can be also suppressed.

Moreover, in the present invention, according as, at the end portion of the center slant groove 1 in the reverse rotation direction, the groove depth is configured to be small, at the end portion of this center slant groove 1 in the reverse rotation direction, an angle θ2 of the tire width direction outer side groove edge 1*bo* of the center slant groove 1 that is formed with respect to the tire circumference direction is formed to be larger than the angle θ1 of a tire width direction inner side groove edge 1*bi* of the center slant groove 1 that is formed with respect to the tire circumference direction. Here, the angle θ2 of the tire width direction outer side groove edge 1*bo* of the center slant groove 1 that is formed with respect to the tire circumference direction is defined as an angle formed by a tangential line of the tire width direction outer side groove edge 1*bo* that passes an outermost point of the tire width direction outer side groove edge 1*bo* in the reverse rotation direction with respect to the tire circumference direction. Hereinafter, the same also applies to θ3 and θ5 to θ7. In other words, as illustrated, in the present invention, a groove width of the center slant groove 1 is formed in such a manner as to enlarge toward the reverse rotation direction at the end portion thereof in the reverse rotation direction, thereby maintaining the favorable drainage property. Thus, in the tire of the present invention, arranging the center slant groove 1 having the above configuration has allowed all the high-speed running performance correspond to circuit running, the drainage property, and the uneven-wear property to be maintained. Note that, in an example as illustrated, since the tire width direction inner side groove edge of the center slant groove 1 substantially exhibits a linear shape, and the outermost points 1A, 1B of the center slant groove 1 in the tire circumference direction are substantially both end points of the tire width direction inner side groove edge, an angle of the tire width direction inner side groove edge 1*bi* at an end portion thereof in the reverse rotation direction that is formed with respect to the tire circumference direction is substantially identical to an angle of the extension direction of the center slant groove 1 that is formed with respect to the tire circumference direction, which is, however, in the present invention, not limitative, but also includes a case in which the tire width direction inner side groove edge of the center slant groove 1 is not linear-shaped, for example, curved shaped, and a case in which the outermost points 1A, 1B of the center slant groove 1 in the tire circumference direction are not both the end points of the tire width direction inner side groove edge.

Note that, in the present invention, it is preferable that at the end portion of the center slant groove 1 in the reverse rotation direction, not only the tire width direction outer side groove edge 1*bo* of the center slant groove 1 but also the tire width direction inner side groove edge 1*bi* of the center slant groove 1 is formed into such a circular-arc-shaped portion as to have an angle thereof formed with respect to the tire circumference direction that increases toward the reverse rotation direction. Thereby, the drainage property can be further improved.

Moreover, in the present invention, it is preferable that also at an end portion of the center slant groove 1 in the rotation direction, the groove depth is made to gradually decrease toward a groove edge 1*c* of the center slant groove 1 in the rotation direction, while, the angle θ1 of a tire width direction inner side groove edge 1*ai* of the center slant groove 1 that is formed with respect to the tire circumference direction is formed to be larger than the angle θ3 of a tire width direction outer side groove edge 1*ao* of the center slant groove 1 that is formed with respect to the tire circumference direction. In other words, as illustrated, in the present invention, the groove width of the center slant groove 1 is formed in such a manner as to enlarge toward the rotation direction also at the end portion thereof in the rotation direction. Since the end portion of the center slant groove 1 in the rotation direction that is near the tire equatorial plane is an area to which an input force is applied most during traction or the like, it is preferable that, also at this portion, the groove depth is configured to be small so as to maintain the rigidity, thereby suppressing uneven wear, while the groove width is configured to be large so as to maintain the drainage property. As a result, the tire width direction outer side groove edge of the center slant groove 1 is formed into such a curved shape as to protrude toward a tire equatorial plane side, which, also in this regard, can contribute to maintaining the high rigidity. Here, as described above, in the example as illustrated, an angle of the tire width direction inner side groove edge 1*ai* that is formed with respect to the tire circumference direction is substantially identical to an angle of the extension direction of the center slant groove 1 that is formed with respect to the tire circumference direction, which is, however, in the present invention, not limitative As illustrated, in the tire of the present invention, the center slant groove 1 fails to traverse the tire equatorial plane, that is, terminates within a tire one side area having a ½ width of a width of the tread surface. This is because the rigidity is most required on the tire equatorial plane. Preferably, as illustrated, if a periphery length of the tread surface is W, the center slant groove 1 is arranged in an area having ¼ W from the tire equatorial plane. Here, the periphery length of the tread surface refers to a length measured along the tread surface in a tire width direction in a state in which a tire is mounted on an applicable rim specified by the below standard and filled to a maximum air pressure specified depending on a tire size specified by the same standard. The standard is determined according to an industrial standard which is valid in an area where the tire is manufactured or used, and, for example, in Japan, the standard is specified in JATMA YEAR BOOK by Japan Automobile Tyre Manufacturers Association; in the United States of America, the standard is specified in YEAR BOOK by the Tire and Rim Association, Inc. (TRA); and, in Europe, the standard is specified in STANDARD MANUAL by the European Tyre and Rim Technical Organization (ETRTO). An input force in the tire width direction (lateral direction) is mainly made in an outer area than the area having ¼ W from the tire equatorial plane, while the center slant groove 1 arranged in a direction similar to the tire circumference direction has the poor rigidity relative to the lateral input force so that arranging the center slant groove 1 in this outer area may cause uneven wear.

Note that a tire circumference direction length of the center slant groove 1 is preferably within a range of 8% to 15% of a tire entire circumference length. If the tire circumference direction length of the center slant groove 1 is too small, ensuring the sufficient drainage property is difficult, and if the tire circumference direction length of the center slant groove 1 is too large, a decrease in rigidity may cause a decrease in steering stability, neither of which is preferable.

In the same tire one side area in which the center slant groove 1 is arranged, at the tire width direction outer side than the end portion of the center slant groove 1 at a tire width direction inner side, and at a location failing to be overlapped with the center slant groove 1 in the tire circumference direction, an outer side slant groove 2 that extends toward the reverse rotation direction while slanting from the tire equatorial plane side to the tire width direction outer side is arranged. An angle θ4 of an extension direction of this outer side slant groove 2 that is formed with respect to the tire circumference direction is larger than the angle θ1 of the extension direction of the center slant groove 1 that is formed with respect to the tire circumference direction. Here, in the present invention, the extension direction of the outer side slant groove 2 is defined, as illustrated, as a direction of a straight line in which outermost points 2A, 2B of the outer side slant groove 2 in the tire circumference direction are connected to each other. In this manner, at the tire width direction outer side than the center slant groove 1, arranging the outer side slant groove 2 in which the angle formed with respect to the tire circumference direction is larger than the center slant groove 1 can further improve the drainage property. However, if such outer side slant groove 2 is arranged at a location overlapped with the center slant groove 1 in the tire circumference direction, the rigidity locally decreases and the uneven-wear property deteriorates, and thus, as illustrated, a location at which the outer side slant groove 2 is arranged is made to be offset in the tire circumference direction with a location at which the center slant groove 1 is arranged. Thereby, the drainage property can be further improved without deteriorating the uneven-wear property.

As illustrated, the outer side slant groove 2 is arranged such that an end portion thereof at the tire width direction inner side overlaps with the center slant groove 1 in the tire width direction, and a groove depth of the outer side slant groove 2 gradually decreases, at an end portion in the rotation direction, toward a groove edge 2c of the outer side slant groove 2 in the rotation direction. Moreover, at an end portion of the outer side slant groove 2 in the rotation direction, the angle θ5 of a tire width direction inner side groove edge 2ai that is formed with respect to the tire circumference direction is larger than the angle θ6 of a tire width direction outer side groove edge 2ao that is formed with respect to the tire circumference direction. If there is a portion at which the grooves fail to overlap with each other in the tire width direction, a portion at which the rigidity is higher than the other portions is locally generated, so that the uneven-wear property at a portion therearound deteriorates. Then, configuring the center slant groove 1 and the outer side slant groove 2 to overlap with each other in the tire width direction allows the rigidity to be uniform in the tire width direction, and configuring the groove depth of the outer side slant groove to be small toward the groove edge 2c in the rotation direction allows a balance relative to the other portions to be improved so that deterioration of the uneven-wear property can be further effectively suppressed. Here, merely configuring the groove depth to be small may cause the drainage property to decrease, but relatively enlarging the angle of a tire width direction inner side groove edge 2ai with respect to the tire circumference direction and enlarging a grove width allow the drainage property to be maintained.

Moreover, at an end portion of the outer side slant groove 2 in the reverse rotation direction, the angle θ7 of a tire width direction inner side groove edge 2bi that is formed with respect to the tire circumference direction is preferably within a range of 45° to 55°. This angle allows both the drainage property and the uneven wear property to be maintained.

Further, as illustrated, the end portions of the center slant groove 1 and the outer side slant groove 2 that are adjacent to each other preferably include corresponding groove edges parallel to each other. In other words, a groove edge 1d of the center slant groove 1 in the reverse rotation direction and a groove edge 2c of the outer side slant groove 2 in the rotation direction are preferably formed to be parallel to each other. The edge grooves of the end portions of the center slant groove 1 and the outer side slant groove 2 that are adjacent to each other are formed to be parallel to each other so that, in a change of a ground contact area from a portion at which the center slant groove 1 is formed to a portion at which the outer side slant groove 2 is formed during cornering, even when a deformation of a groove end portion occurs due to an input force even though the deformation is microscopic, a deformation direction thereof is the same direction, and thus a behavior becomes smooth and an effect of improving the steering stability performance can be obtained.

Still further, in the tire of the present invention, at a location overlapped with the center slant groove 1 in the tire circumference direction and at the tire width direction outer side than the center slant groove 1, an outer side thin groove 3 is preferably arranged. The outer side thin groove 3 has a groove width smaller than a groove width of a portion of the center slant groove 1 which overlaps with the outer side thin groove 3 in the tire circumference direction that is measured in a direction orthogonal to the extension direction of the groove. If there is only the outer side slant groove 2 in an area at the tire width direction outer side than the center slant groove 1, a stepwise difference in rigidity is large in the tire circumference direction, and thus, between where the outer side slant groove 2 is arranged and at a location overlapping with the center slant groove 1 in the tire circumference direction, the outer side thin groove 3 is arranged so that the rigidity in the tire circumference direction is made to be uniform and occurrence of uneven wear in the area at the tire width direction outer side than the center slant groove 1 can be suppressed.

An angle θ8 of an extension direction of the outer side thin groove 3 that is formed with respect to the tire circumference direction is preferably within a range of 45° to 55°. Here, in the present invention, the extension direction of the outer side thin groove 3 is defined, as illustrated, as a direction of a straight line in which outermost points 3A, 3B of the outer side thin groove 3 in the tire circumference direction are connected to each other. This angle allows both the drainage property and the uneven-wear property to be maintained. Moreover, preferably, the outer side thin groove 3 is arranged in an area having ¼ W from a tire width direction end portion of the tread surface with respect to the periphery length W of the tread surface.

An arrangement pitch of the center slant groove 1, the outer side slant groove 2, and the outer side thin groove 3 in the present invention is not particularly limited, but, for example, can be configured to be approximately ⅙ to 1/10 of an entire circumference length of the tire. Moreover, tire circumference direction locations of the center slant groove 1, the outer side slant groove 2, and the outer side thin groove 3 in the present invention are arranged alternately on both sides of the tread surface with the tire equatorial plane CL interposed therebetween in such a manner as to be shifted by ½ of the arrangement pitch.

In the present invention, only that conditions related to the tread pattern as described above are satisfied is important, and expected effects of the present invention can be thereby obtained, while the other details, such as a tire structure and a material of each member, are not particularly limited. For example, the tire of the present invention is composed of a tread portion that forms a tread surface portion, a pair of side wall portions that are connected to both sides of the tread portion, and a pair of bead portions, and usually includes a carcass that is arranged to range between bead cores buried in the corresponding pair of bead portions and reinforces each component, and at least one belt that is arranged at a crown portion tire radial direction outer side thereof and reinforces the tread portion. The present invention is useful as a rear tire for a two-wheeled motor vehicle.

EXAMPLES

Hereinafter, the present invention will be described in more detail with reference to examples.

In accordance with conditions as indicated in the below table, a tire for a two-wheeled motor vehicle with a tire size of 180/55ZR17 including a pair of bead portions, a pair of side wall portions, and a tread portion toroidally extending between both the side wall portions, and having a directional pattern in which, as illustrated in FIG. 1, a rotation direction when mounted on a vehicle is designated was manufactured. Note that, in each example, a groove depth of a center slant groove at an end portion in the rotation direction gradually decreased toward a groove edge thereof in the rotation direction, while also a groove depth of an outer side slant groove at an end portion in the rotation direction gradually decreased toward a groove edge thereof in the rotation direction.

Each obtained sample tire was mounted on a two-wheeled motor vehicle, a running was performed in a test course at a speed of 130 km per hour, and the presence of uneven wear occurred was checked each in a case of running of 3000 km and in a case of running of 6000 km. Moreover, according to sensation evaluations by a rider in actual vehicle tests, a running performance on a wet road surface, and a high-speed steering stability performance on a dry road surface at a speed of 150 km per hour are each evaluated and indicated in a relative index with comparative example 1 being 100. With respect to each numerical value, a higher numerical value means more favorable. Results thereof are also indicated in the below table.

TABLE 1

| | Comparative example 1 | Comparative example 2 | Example 1 | Example 2 | Example 3 | Comparative example 3 | Comparative example 4 |
|---|---|---|---|---|---|---|---|
| Angle of center slant groove (°)[1] | 2 | 12 | 3 | 5 | 10 | 5 | 5 |
| Magnitude of angle of inner and outer groove edge at reverse rotation direction end portion of center slant groove[2] | A | A | A | A | A | A | B |
| State of groove depth of reverse rotation direction end portion of center slant groove[3] | A | A | A | A | A | B | A |
| Presence of uneven wear (3000 km running) | Not confirmed | Confirmed | Not confirmed | Not confirmed | Not confirmed | Not confirmed | Not confirmed |
| Presence of uneven wear (6000 km running) | Not confirmed | Confirmed | Not confirmed | Not confirmed | Not confirmed | Confirmed | Not confirmed |
| Wet performance (index) | 100 | 100 | 104 | 105 | 104 | 105 | 98 |
| High-speed steering stability performance (index) | 100 | 99 | 100 | 100 | 100 | 98 | 100 |

[1] Angle of an extension direction of the center slant groove that is formed with respect to a tire circumference direction.
[2] At the end portion of the center slant groove in the reverse rotation direction, whether an angle θ2 of a tire width direction outer side groove edge of the center slant groove that is formed with respect to the tire circumference direction is larger (A) or smaller (B) than an angle θ1 of a tire width direction inner side groove edge of the center slant groove that is formed with respect to the tire circumference direction is indicated.
[3] At an end portion of the center slant groove in a reverse rotation direction, whether the groove depth of the center slant groove gradually decreases toward a groove edge thereof in the reverse rotation direction (A) or fails to decrease (B) is indicated.

As indicated in the above table, in the tire of each example in which a tread surface is provided with the center slant groove satisfying predetermined conditions according to the present invention, it has been confirmed that occurrence of uneven wear was suppressed while the drainage property and the steering stability performance during high-speed running were favorably ensured. On the other hand, in comparative example 2 in which the angle of the center slant groove is too large, uneven wear occurs at an early stage, and in comparative example 3 in which, at the end portion of the center slant groove in the reverse rotation direction, the groove depth of the center slant groove fails to vary toward the groove edge thereof in the reverse rotation direction, a decrease in high-speed steering stability performance occurred due to a decrease in block rigidity. Moreover, in comparative example 4 in which, at the end portion of the center slant groove in the reverse rotation direction, the angle θ2 of the center slant groove is smaller than the angle θ1, that is, a groove width is small, the wet performance deteriorated.

DESCRIPTION OF SYMBOLS 1 center slant groove, 1A, 1B outermost point of center slant groove in tire circumference direction, 1*ai* tire width direction inner side groove edge at end portion of center slant groove in rotation direction, 1*ao* tire width direction outer side groove edge at end portion of center slant groove in rotation direction, 1*bi* tire width direction inner side groove edge at end portion of center slant groove in reverse rotation direction, 1*bo* tire width direction outer side groove edge at end portion of center slant groove in reverse rotation direction, 1*c* groove edge of center slant groove in rotation direction, 1*d* groove edge of center slant groove in reverse rotation direction, 2 outer side slant groove, 2A, 2B outermost point of outer side slant groove in tire circumference direction, 2*ai* tire width direction inner side groove edge at end portion of outer side slant groove in rotation direction, 2*ao* tire width direction outer side groove edge at end portion of outer side slant groove in rotation direction, 2*bi* tire width direction inner side groove edge at end portion of outer side slant groove in reverse rotation direction, 2*c* groove edge of outer side slant groove in rotation direction, 3 outer side thin groove, 3A, 3B outermost point of outer side thin groove in tire circumference direction.

The invention claimed is:

1. A tire for a two-wheeled motor vehicle in which a rotation direction when mounted on the vehicle is designated, the tire comprising:
   a center slant groove that is in the vicinity of a tire equatorial plane of a tread surface and that extends toward a reverse rotation direction of the designated rotation direction while slanting from a tire equatorial plane side to a tire width direction outer side, wherein:
   an angle of an extension direction of the center slant groove that is formed with respect to a tire circumference direction is within a range of 3° to 10°,
   toward an end of the center slant groove in the reverse rotation direction, a tire width direction outer side groove edge of the center slant groove has a circular-arc-shaped portion so that an angle between the tire width direction outer side groove edge and the tire circumference direction (i) increases toward the reverse rotation direction and (ii) is larger than an angle between a tire width direction inner side groove edge of the center slant groove and the tire circumference direction,
   a groove depth of the center slant groove gradually decreases toward a groove edge of the center slant groove in the reverse rotation direction, and
   a distance in the tire width direction between the tire width direction outer side and tire width direction inner side groove edges of the center slant groove increases from a center of the center slant groove in the circumferential direction toward both the rotation direction and the reverse rotation direction.

2. The tire for a two-wheeled motor vehicle according to claim 1, further comprising:
   more toward the tire width direction outer side than a tire width direction inner side end of the center slant groove, and at a location outside an area extending toward the tire width direction outer side from the tire equatorial plane and between rotation direction and reverse rotation direction end points of the center slant groove in the tire circumference direction, an outer side slant groove that extends toward the reverse rotation direction while slanting from the tire equatorial plane side to the tire width direction outer side,
   wherein an angle between an extension direction of the outer side slant groove and the tire circumference direction is larger than the angle of the extension direction of the center slant groove.

3. The tire for a two-wheeled motor vehicle according to claim 2, wherein:
   a tire width direction inner side end of the outer side slant groove is inside an area between tire width direction inner side and tire width direction outer side end points of the center slant groove, and
   toward an end of the outer side slant groove in the rotation direction, (i) a groove depth of the outer side slant groove gradually decreases toward a groove edge of the outer side slant groove in the rotation direction and (ii) an angle between a tire width direction inner side groove edge and the tire circumference direction is larger than an angle between a tire width direction outer side groove edge and the tire circumference direction.

4. The tire for a two-wheeled motor vehicle according to claim 2, wherein the ends of the center slant groove and the outer side slant groove that are adjacent to each other include corresponding groove edges parallel to each other.

5. The tire for a two-wheeled motor vehicle according to claim 1, wherein toward an end of the center slant groove in the rotation direction, (i) the groove depth of the center slant groove gradually decreases toward a groove edge of the center slant groove in the rotation direction and (ii) an angle between the tire width direction inner side groove edge of the center slant groove and the tire circumference direction is larger than an angle between the tire width direction outer side groove edge of the center slant groove and the tire circumference direction.

6. The tire for a two-wheeled motor vehicle according to claim 1, wherein
   the tire width direction inner side groove edge of the center slant groove is substantially linear.

7. The tire for a two-wheeled motor vehicle according to claim 6, wherein
   the center slant groove lacks a bent portion.

8. The tire for a two-wheeled motor vehicle according to claim 1, wherein:
   the center slant groove does not traverse the tire equatorial plane, and
   the center slant groove is limited to an area of ¼W from the tire equatorial plane, W being a periphery length of the tread surface.

9. The tire for a two-wheeled motor vehicle according to claim 1, wherein the length of the center slant groove in the tire circumference direction is within a range of 8% to 15% of an entire circumferential length of the tire.

10. The tire for a two-wheeled motor vehicle according to claim 2, wherein toward an end of the outer side slant groove in the reverse rotation direction, an angle between a tire width direction inner side groove edge and the tire circumference direction is within a range of 45° to 55°.

11. The tire for a two-wheeled motor vehicle according to claim 2, wherein more toward the tire width direction outer side than the center slant groove, an outer side thin groove is located within the area between the rotation direction and reverse rotation direction end points of the center slant groove in the tire circumference direction.

12. The tire for a two-wheeled motor vehicle according to claim 11, wherein a groove width of the outer side thin groove in a direction orthogonal to an extension direction of the outer side thin groove is smaller than a groove width of a portion of the center slant groove that is coextensive with the outer side thin groove in the circumference direction.

13. The tire for a two-wheeled motor vehicle according to claim 11, wherein:

an angle of an extension direction of the outer side thin groove that is formed with respect to the tire circumference direction is within a range of 45° to 55°, and the outer side thin groove is limited to an area of ¼W from a tire width direction end portion of the tread surface, W being a periphery length of the tread surface.

14. The tire for a two-wheeled motor vehicle according to claim 11, wherein an arrangement pitch of the center slant groove, the outer side slant groove, and the outer side thin groove is approximately ⅙ to ​1/10 of an entire circumferential length of the tire.

15. The tire for a two-wheeled motor vehicle according to claim 1, wherein:

the circular-arc-shaped portion of the tire width direction outer side slant groove edge of the center slant groove extends from the center toward both the end of the center slant groove in the reverse rotation direction and an end of the center slant groove in the rotation direction, and the circular-arc-shaped portion constitutes the majority of the tire width direction outer side groove edge of the center slant groove.

* * * * *